US012795286B2

(12) United States Patent
Shinmen et al.

(10) Patent No.: US 12,795,286 B2
(45) Date of Patent: Nov. 10, 2026

(54) ACOUSTIC PROCESSING DEVICE

(71) Applicant: SONY GROUP CORPORATION, Tokyo (JP)

(72) Inventors: Naoki Shinmen, Tokyo (JP); Go Igarashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 250 days.

(21) Appl. No.: 18/704,552

(22) PCT Filed: Oct. 25, 2022

(86) PCT No.: PCT/JP2022/039615
§ 371 (c)(1),
(2) Date: Apr. 25, 2024

(87) PCT Pub. No.: WO2023/080008
PCT Pub. Date: May 11, 2023

(65) Prior Publication Data

US 2026/0156398 A1 Jun. 4, 2026

(30) Foreign Application Priority Data

Nov. 4, 2021 (JP) ................................ 2021-180534

(51) Int. Cl.
*H04R 1/10* (2006.01)
*H04R 1/08* (2006.01)

(52) U.S. Cl.
CPC ............ *H04R 1/1041* (2013.01); *H04R 1/08* (2013.01); *H04R 1/1008* (2013.01); *H04R 1/1075* (2013.01); *H04R 2420/07* (2013.01)

(58) Field of Classification Search
CPC ...... H04R 1/1041; H04R 1/08; H04R 1/1008; H04R 1/1075
See application file for complete search history.

(56) References Cited

U.S. PATENT DOCUMENTS 5,182,774 A * 1/1993 Bourk .................. H04R 1/1083 381/372
9,955,279 B2 * 4/2018 Riggs ...................... H04S 7/304
(Continued)

FOREIGN PATENT DOCUMENTS

| | | |
|---|---|---|
| JP | 2019-054337 A | 4/2019 |
| WO | 2014/030560 A1 | 2/2014 |
| WO | 2021/199742 A1 | 10/2021 |

OTHER PUBLICATIONS

International Search Report and Written Opinion of PCT Application No. PCT/JP2022/039615, issued on Dec. 6, 2022, 08 pages of ISRWO.

*Primary Examiner* — Olisa Anwah
(74) *Attorney, Agent, or Firm* — CHIP LAW GROUP

(57) ABSTRACT

To improve convenience at the time of wearing. An acoustic processing device (10) includes: a speaker (140); a housing (100) including a partition wall that holds the speaker (140) and separates a front face and a back face of the speaker (140); an ear pad (150) attached along the housing (100), the ear pad having a shape that surrounds a pinna when worn on a person; a microphone (170) that collects a sound wave output from the speaker (140) and outputs a sound signal; a microphone holder (160) that holds the microphone, the microphone holder having a film shape disposed in the vicinity of the ear pad (150); and a transfer characteristic detection unit (210) that detects transfer characteristics of the external ear of the person on the basis of the sound signal that has been output.

14 Claims, 9 Drawing Sheets

(56) References Cited

U.S. PATENT DOCUMENTS

| | | | | |
|---|---|---|---|---|
| 10,212,503 | B1 * | 2/2019 | Dittberner | H04R 1/1008 |
| 11,445,290 | B1 * | 9/2022 | Grinker | G10K 11/17825 |
| 2003/0190047 | A1 * | 10/2003 | Aarts | H04S 1/005<br>381/310 |
| 2020/0202839 | A1 * | 6/2020 | Asada | H04R 1/105 |

* cited by examiner

ACOUSTIC PROCESSING DEVICE

CROSS REFERENCE TO RELATED APPLICATIONS

This application is a U.S. National Phase of International Patent Application No. PCT/JP2022/039615 filed on Oct. 25, 2022, which claims priority benefit of Japanese Patent Application No. JP 2021-180534 filed in the Japan Patent Office on Nov. 4, 2021. Each of the above-referenced applications is hereby incorporated herein by reference in its entirety.

FIELD

The present disclosure relates to an acoustic processing device.

BACKGROUND

In acoustic processing devices such as a headphone device, an acoustic processing device including a microphone that collects the sound in the vicinity of a pinna is used. Such an acoustic processing device can process a sound signal on the basis of a signal generated by sound collection by the microphone. For example, an acoustic processing device is proposed in which an earphone device is disposed in the vicinity of the entrance of the external auditory canal or in the external auditory canal, an acoustic signal is generated by a microphone of the earphone device and transmitted to a headphone device, and noise cancellation processing based on the acoustic signal is performed in the headphone device (see, for example, Patent Literature 1). The earphone device is fixed by an arm-shaped grip portion extending from the headphone device.

CITATION LIST

Patent Literature

Patent Literature 1: JP 2019-054337 A

Summary

Technical Problem

However, in the above-described conventional technology, it is necessary to wear the earphone device portion having a protruding shape in such a manner as to be accommodated in the pinna, which disadvantageously deteriorates the convenience.

Therefore, the present disclosure proposes an acoustic processing device that improves convenience at the time of wearing.

Solution to Problem

An acoustic processing device according to the present disclosure includes: a speaker; a housing including a partition wall that holds the speaker and separates a front face and a back face of the speaker; an ear pad fixed to the housing, the ear pad having a shape that surrounds a pinna when worn by a person; a microphone that collects a sound wave output from the speaker and outputs a sound signal; a microphone holder that holds the microphone, the microphone holder having a film shape disposed in a vicinity of the ear pad; and a transfer characteristic detection unit that detects a transfer characteristic of an external ear of the person on a basis of the sound signal that has been output.

DESCRIPTION OF EMBODIMENTS

Hereinafter, embodiments of the present disclosure will be described in detail on the basis of the drawings.

Description will be given in the following order. Note that in each of the following embodiments, the same parts are denoted by the same symbols, and redundant description will be omitted.

1. First Embodiment
2. Second Embodiment
3. Third Embodiment
4. Fourth Embodiment
5. Fifth Embodiment

1. First Embodiment

[Configuration of Acoustic Processing Device]

Figure 1:
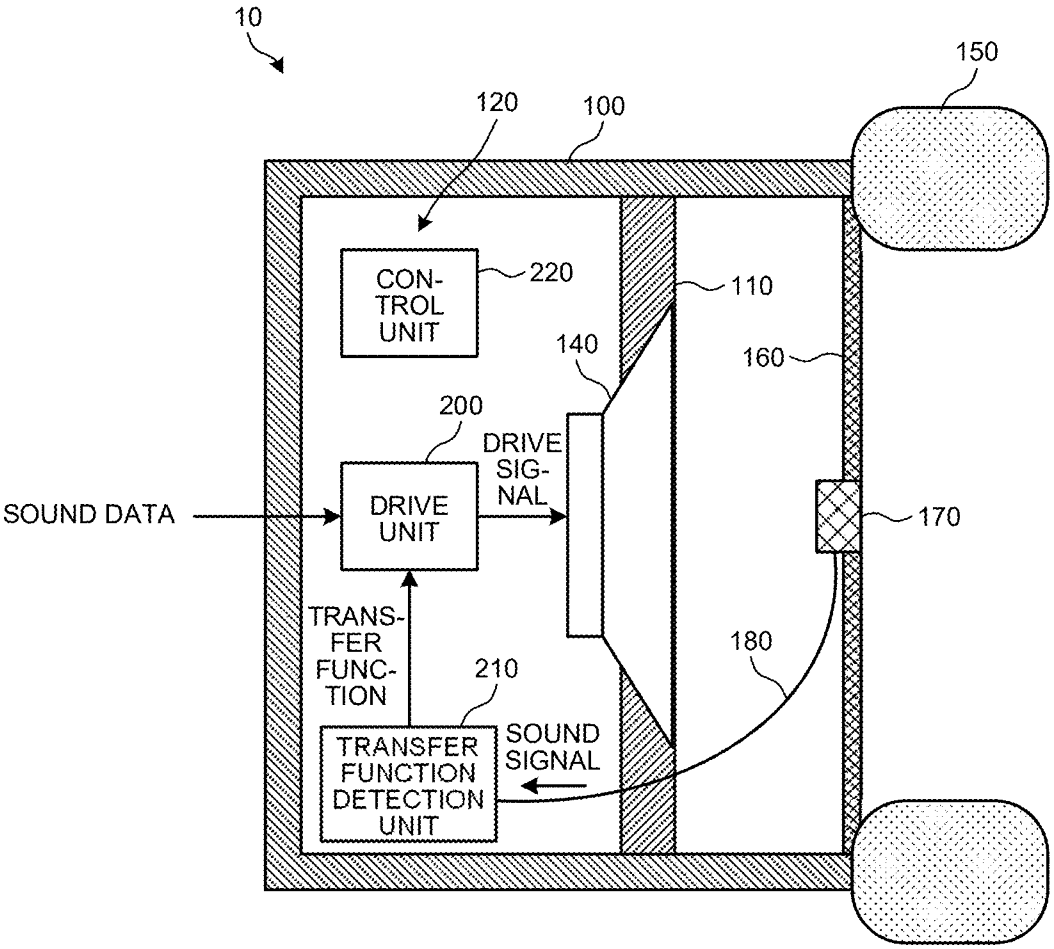
FIG. 1 is a diagram illustrating a configuration example of an acoustic processing device according to a first embodiment of the present disclosure.

FIG. 1 is a diagram illustrating a configuration example of an acoustic processing device according to a first embodiment of the present disclosure. The drawing is a schematic cross-sectional view illustrating the configuration example of an acoustic processing device 10. The acoustic processing device 10 in the drawing is configured as a headphone device including a microphone. This microphone is disposed in the vicinity of a pinna of a user and has a function of collecting sound from the microphone of its own headphone device to generate a sound signal. On the basis of the sound signal, the acoustic processing device 10 detects transfer characteristics (transfer function) of the external ear of the user, for example, a head related transfer function (HRTF). Next, the acoustic processing device 10 adjusts sound data on the basis of the transfer function and outputs the sound data from a speaker. As a result, the acoustic processing device 10 can reduce the difference in hearing of the sound based on a difference in the head related transfer function of the user.

The acoustic processing device 10 includes a housing 100, a speaker 140, an ear pad 150, a microphone 170, a microphone holder 160, a drive unit 200, a transfer function detection unit 210, and a control unit 220. Note that the drawing illustrates a configuration example of the acoustic processing device 10 worn on one of the ears of the user. It is also possible to include two acoustic processing devices 10 in the drawing for both ears.

The housing 100 houses members such as the speaker 140. The housing 100 is formed in a shape that covers the pinna of the user and includes a partition wall 110 that holds the speaker 140 in a substantially central portion. The partition wall 110 separates the front face and the back face of the speaker 140. Of the space of the housing 100 partitioned by the partition wall 110, a space on the back face side of the speaker 140 is referred to as a back face volume space 120. The partition wall 110 inhibits exchange of the air between the front face side and the back face side of a diaphragm of the speaker 140, thereby improving efficiency of acoustic emission to the front face of the diaphragm of the speaker 140. The partition wall 110 can have a shape that seals the back face volume space 120, for example. Alternatively, the partition wall 110 can have a semi-sealed shape having a duct, for example. Note that the drive unit 200, the transfer function detection unit 210, and the control unit 220 to be described later can be arranged in the back face volume space 120.

The ear pad 150 is a flexible member attached along the housing 100 and has a shape that surrounds the pinna when worn by a person. The ear pad 150 can be formed by, for example, covering annular foam or the like with a synthetic leather, cloth or the like. Note that members constituting the ear pad are not limited to these examples as long as they are harmless to the human body and has flexibility and does not affect acoustic characteristics.

The speaker 140 outputs sound such as music. As described above, the speaker 140 is held by the partition wall 110 of the housing 100. Furthermore, the speaker 140 is driven by the drive unit 200 described later. Note that the speaker 140 further outputs a sound wave for detecting a transfer function.

The microphone 170 collects sound (sound wave) output from the speaker 140 and outputs a sound signal. The microphone 170 is disposed in the vicinity of the pinna of the user when the acoustic processing device 10 is used, collects sounds reflected from the pinna, the external auditory canal, and the eardrum in addition to the direct sound output from the speaker 140, converts the sounds into a sound signal which is an electric signal, and outputs the sound signal. This sound signal is transmitted to the transfer function detection unit 210 via a microphone signal line 180 in the drawing. For example, the microphone signal line 180 can be disposed to penetrate through the partition wall 110. Note that the microphone signal line 180 only needs to be disposed in such a manner that the microphone 170 and the transfer function detection unit 210 can be connected and can be wired inside the housing 100 other than the partition wall 110 or along a surface of the microphone holder 160 to be described later.

The microphone holder 160 has a film shape disposed in the vicinity of the ear pad 150 and holds the microphone 170. Illustrated is an example in which the microphone holder 160 in the drawing is disposed in the ear pad 150 in the vicinity of the housing 100. The microphone holder 160 can be made of a member having elasticity and acoustic permeability, for example, a mesh-like resin film. Note that the member constituting the microphone holder 160 may be a member other than a resin film as long as the member has elasticity and acoustic permeability. Furthermore, the microphone 170 can be held by being bonded, sewn, or the like to the microphone holder 160. Alternatively, the microphone 170 can also be held, for example, by being clamped substantially in the center of a two-layered net-like microphone holder 160. Note that the installation location of the microphone 170 is not limited to substantially the center of the microphone holder 160.

The drive unit 200 drives the speaker 140. The drive unit 200 generates and outputs a drive signal for driving the speaker 140 on the basis of sound data input from an external device. The sound data corresponds to, for example, a sound signal that is a signal of sound signal to be output by the speaker 140. In this case, the sound data can be input via the signal line.

In addition, for example, it is also possible to adopt a system in which a wireless communication unit that performs communication by a communication system such as Wi-Fi (registered trademark) or Bluetooth (registered trademark) is included in the housing 100 and music signals are received by wireless communication. In this case, music signals can be acquired by wireless communication with an external device (smartphone, personal computer, tablet, and the like). It is also possible to adopt a system of streaming from a server or a cloud. It is also possible to adopt a configuration in which a storage unit that stores music signals is disposed in the housing 100 and caused to store downloaded music content or the like. In this case, music signals read from the storage unit can be input to the drive unit.

The drive unit 200 amplifies the sound data (sound signal) to generate a sound signal capable of driving the speaker 140 and outputs the sound signal to the speaker 140 as a drive signal. At the time of this amplification, the drive unit 200 adjusts the sound data on the basis of the transfer function of the external ear of the user. This transfer function is input by the transfer function detection unit 210. Details of the transfer function of the external ear of the user and adjustment of the sound data will be described later.

The transfer function detection unit 210 detects the transfer function of the external ear of the user of the acoustic processing device 10 as transfer characteristics and outputs the transfer function to the drive unit 200. The transfer function detection unit 210 can detect the transfer function of the external ear of the user by estimating the transfer function on the basis of the sound signal output from the microphone 170, for example. The transfer function can be estimated by comparing a predetermined drive signal (sound signal) output from the speaker 140 with a sound signal input from the microphone 170. The transfer characteristics can be estimated also from input shape data of the external ear using machine learning. Note that the transfer function detection unit 210 is an example of the transfer characteristic detection unit described in the claims.

The control unit 220 controls the entire acoustic processing device 10. Furthermore, the control unit 220 further controls detection of a transfer function in the transfer function detection unit 210. The control unit 220 performs control to cause the drive unit 200 to output a sound wave for transfer function detection at predetermined timing and performs control to cause the transfer function detection unit 210 to estimate a transfer function. The control of the detection of the transfer function can be performed at the timing of activation of the acoustic processing device 10 or when the acoustic processing device 10 is worn by the user.

The transfer characteristics such as frequency characteristics or group delay characteristics in a path through which the sound reproduced by the speaker 140 reaches the eardrum of the user vary depending on the shape or others of the external ear of the user. Specifically, the transfer characteristics change depending on the shape of the pinna and the external auditory canal of the user, the distance to the eardrum, the contact state of the ear pad 150 with the head, and the wearing state of the acoustic processing device 10. Therefore, depending on the user and the use situation, the tone changes and the sound of the reproduced sound changes. Moreover, in a case where signal processing is performed in the drive unit 200 or others, this also affects such as that the effect or the stability of the signal processing is reduced. For example, when signal processing of the virtual surround is performed, frequency characteristics related to direction recognition is affected by a change in the transfer characteristics, which causes a problem that a desired sense of localization cannot be obtained. Furthermore, for example, when noise cancellation processing is performed, a cancellation signal is affected by the transfer characteristics, and a phase shift occurs between noise and the cancellation signal at the eardrum position, and the noise cancellation amount decreases.

Therefore, it is possible to detect transfer characteristics at the time of use of the acoustic processing device 10, to adjust the drive signal of the speaker 140 on the basis of the transfer characteristics, and to reduce a change in hearing of the reproduced sound. The adjustment of the sound data is performed by a filter 201 described later. In addition, correction at the time of performing signal processing can be further performed, and an error in the signal processing can be reduced.

[Configuration of Drive Unit]

Figure 2:
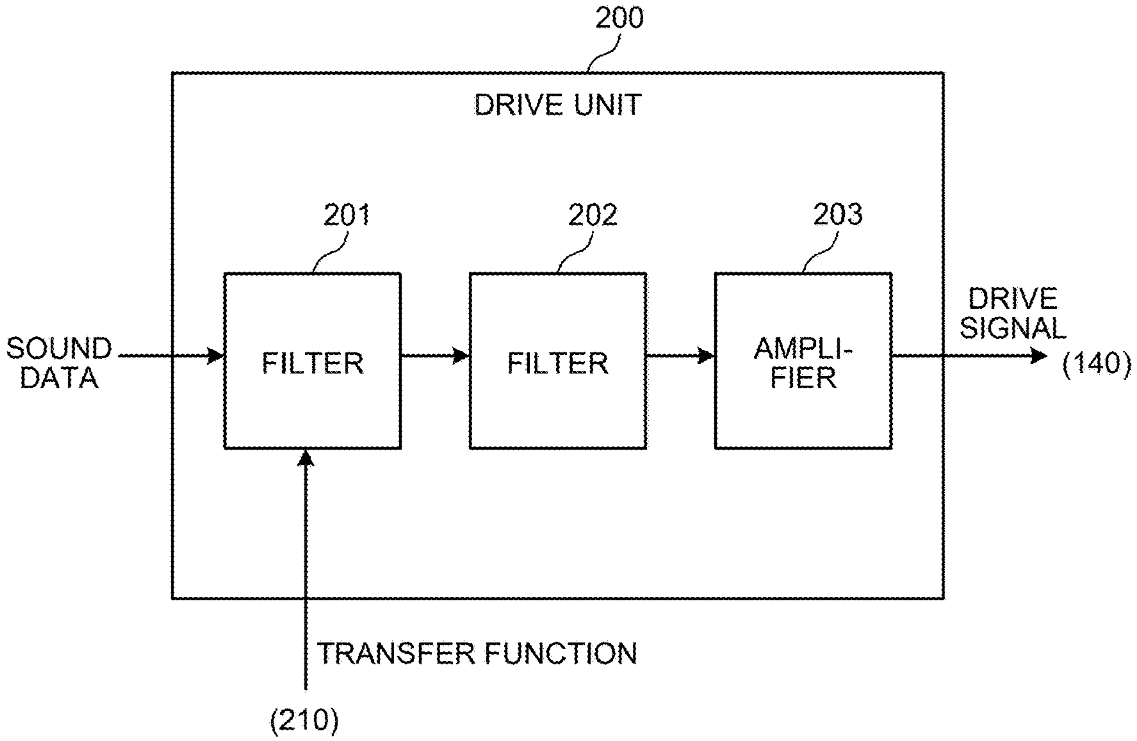
FIG. 2 is a diagram illustrating a configuration example of a drive unit according to the first embodiment of the disclosure.

FIG. 2 is a diagram illustrating a configuration example of the drive unit according to the first embodiment of the disclosure. The drawing is a block diagram illustrating a configuration example of the drive unit 200. The drive unit 200 in the drawing includes a filter 201, a filter 202, and an amplifier 203.

The filter 201 adjusts sound data on the basis of the transfer function input from the transfer function detection unit 210. The adjusted sound data is output to the filter 202.

The filter 202 corrects the sound data input from the filter 201. The correction of the sound data corresponds to, for example, corrections according to spatial representation such as addition of reverberation based on spatial information set by a content creator or expression of tones. In this case, the information such as the spatial representation or the expression of tones is input, for example, accompanying the sound data. Furthermore, as the correction of the sound data, for example, signal processing such as correction depending on the tone of the speaker 140 can be performed. The corrected sound data is output to the amplifier 203.

The amplifier 203 generates and outputs a drive signal of the speaker 140 on the basis of the sound data input from the filter 202.

[Wearing Acoustic Processing Device]

Figure 3:
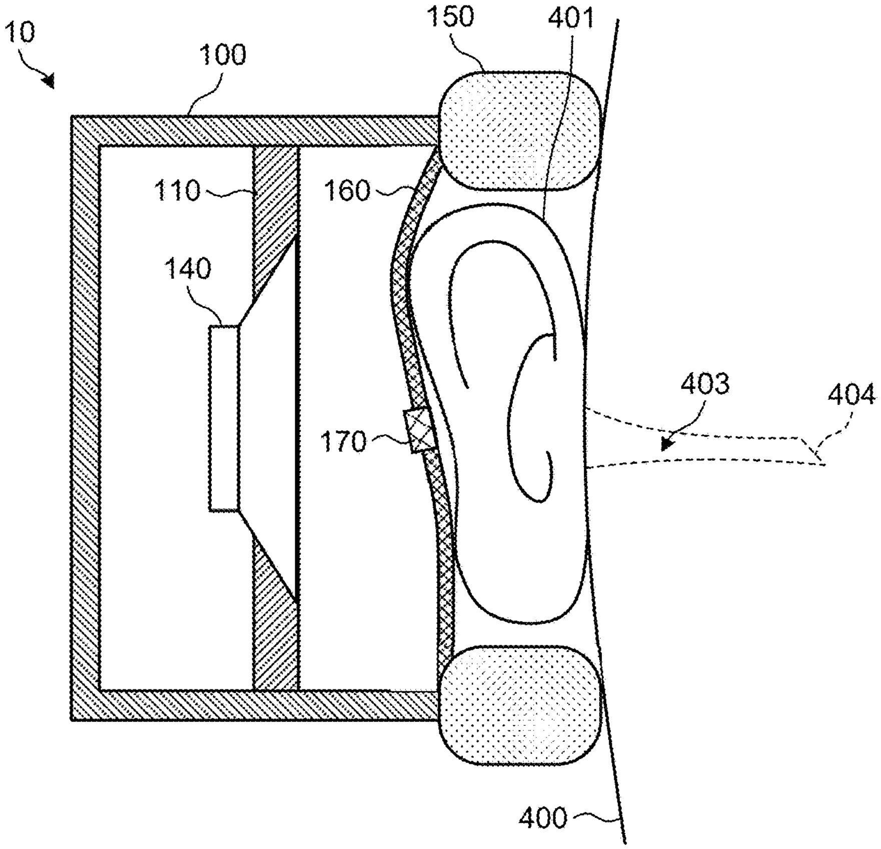
FIG. 3 is a diagram illustrating a configuration example of the acoustic processing device according to the first embodiment of the present disclosure at the time of use.

FIG. 3 is a diagram illustrating a configuration example of the acoustic processing device according to the first embodiment of the present disclosure at the time of use. The drawing is a schematic cross-sectional view illustrating a configuration example when the user of the acoustic processing device 10 wears the acoustic processing device 10. In the drawing, illustration of the drive unit 200, the transfer function detection unit 210, and the control unit 220 is omitted.

As illustrated in the drawing, in the acoustic processing device 10, the ear pad 150 is brought into pressure contact with and brought into close contact with a head 400 of the user at the time of use. At this point, as illustrated in the drawing, the ear pad 150 surrounds a pinna 401. In addition, the end portion of the pinna 401 abuts on and presses the microphone holder 160 to extend the microphone holder 160. Therefore, the microphone holder 160 is deformed and attached in a stretched manner along the contour of the pinna 401. As a result, the movement of the microphone 170 is restricted. Even in a case where the user moves the head by walking or the like, displacement of the microphone 170 can be reduced. Note that, with the microphone holder 160 including an elastic member, deformation of the pinna 401 by the microphone holder 160 can be mitigated, and discomfort of the user can be mitigated. In addition, since the deformation of the pinna 401 is mitigated, it is possible to reduce variations in detection of the transfer characteristics. Furthermore, since the microphone 170 is disposed at a position close to an external auditory canal 408 and an eardrum 404, the detection accuracy of the transfer characteristics of the external auditory canal can be improved.

Figure 4:
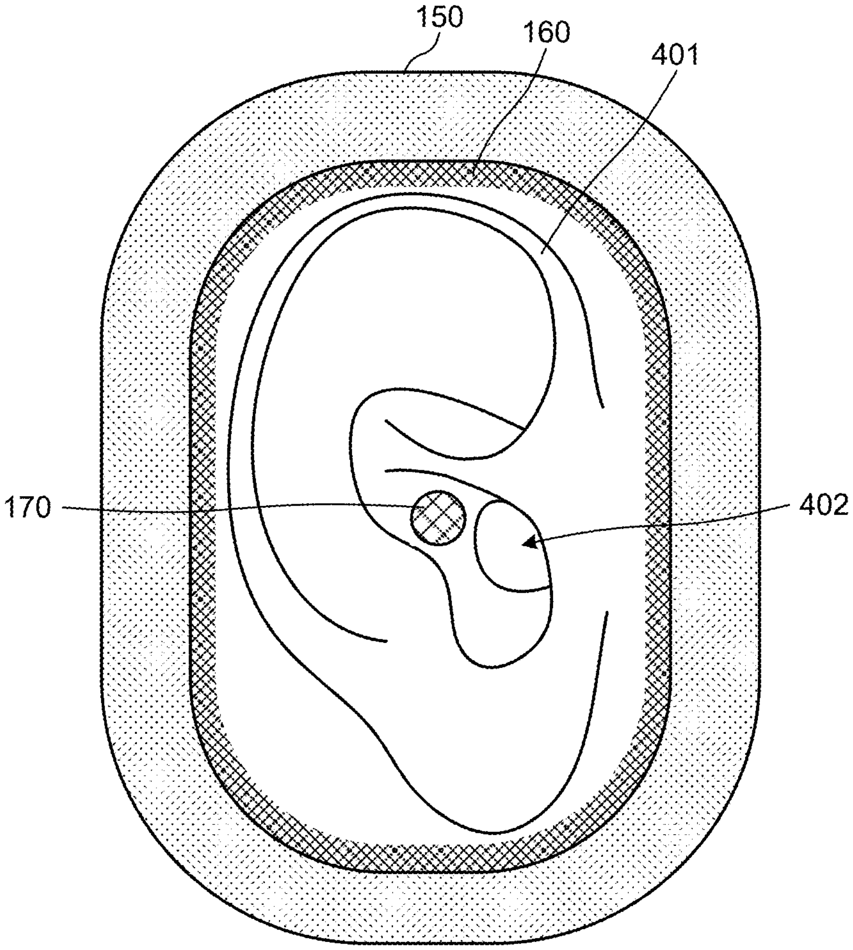
FIG. 4 is a plan view illustrating an example of the acoustic processing device according to the first embodiment of the disclosure at the time of use.

FIG. 4 is a plan view illustrating an example of the acoustic processing device according to the first embodiment of the disclosure at the time of use. The drawing is a diagram illustrating an example of the pinna 401, the ear pad 150, the microphone holder 160, and the microphone 170 when the acoustic processing device 10 is used as viewed from the housing 100 side. In the drawing, illustration of the housing 100, the speaker 140, and others are omitted. The ear pad 150 is disposed at a position surrounding the pinna 401, and the microphone holder 160 is attached in a stretched manner by the pinna 401 as described above. The microphone 170 is disposed, for example, in the vicinity of an external acoustic foramen 402.

[Other Configurations of Acoustic Processing Device]

Figure 5:
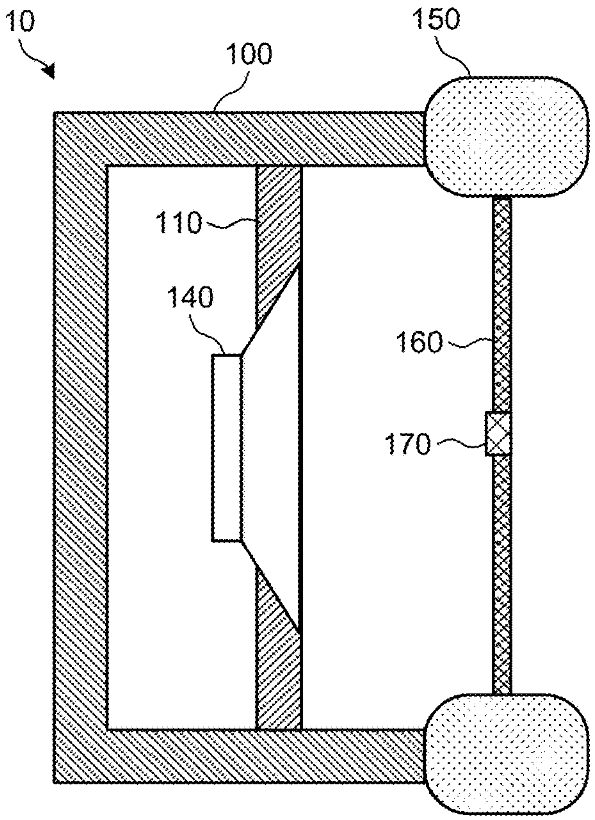
FIG. 5 is a diagram illustrating another configuration example of the acoustic processing device according to the first embodiment of the present disclosure.
Figure 6:
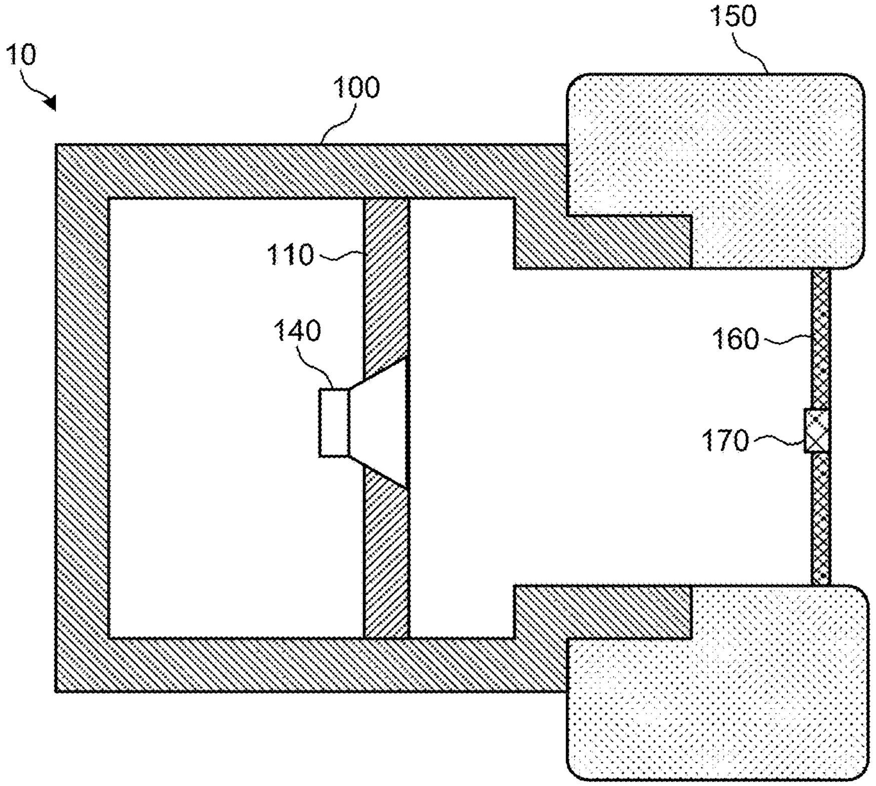
FIG. 6 is a diagram illustrating another configuration example of the acoustic processing device according to the first embodiment of the present disclosure.

FIGS. 5 and 6 are diagrams illustrating another configuration example of the acoustic processing device according to the first embodiment of the present disclosure. FIGS. 5 and 6 are schematic cross-sectional views illustrating other configuration examples of the acoustic processing device 10. In the drawings, illustration of the drive unit 200, the transfer function detection unit 210, and the control unit 220 is omitted.

FIG. 5 is a diagram illustrating an example in which the microphone holder 160 is disposed at a central portion of the ear pad 150.

FIG. 6 illustrates an example of an acoustic processing device 10 using a housing 100 having a canal shape. The ear pad 150 in the drawing has a shape of an ear piece to be inserted into the external acoustic foramen 402. The microphone holder 160 in the drawing is disposed in the ear pad 150.

Note that the configuration of the acoustic processing device 10 is not limited to this example. For example, it is also possible to adopt a configuration in which the microphone 170 and the transfer function detection unit 210 wirelessly exchange data. In this case, the acoustic processing device 10 further includes a transmission unit that wirelessly transmits a sound signal from the microphone 170 and a reception unit that receives the transmitted sound signal and outputs the sound signal to the transfer function detection unit 210. Note that the transmission unit and reception unit are an example of the supply unit described in the claims.

As described above, the acoustic processing device 10 according to the first embodiment of the disclosure detects the transfer characteristics of the external ear with the microphone 170 disposed in the microphone holder 160 and by detecting the sound reflected from the pinna 401 or the like. Furthermore, the microphone 170 can be easily attached, and the convenience can be improved.

2. Second Embodiment

In the acoustic processing device 10 of the first embodiment described above, the microphone holder 160 is fixed to the ear pad 150 and others. Meanwhile, an acoustic processing device 10 according to the second embodiment of the disclosure is different from the first embodiment in that a microphone holder 160 is fixed to an ear pad coupling unit that couples an ear pad 150 to a housing 100.

[Configuration of Acoustic Processing Device]

Figure 7:
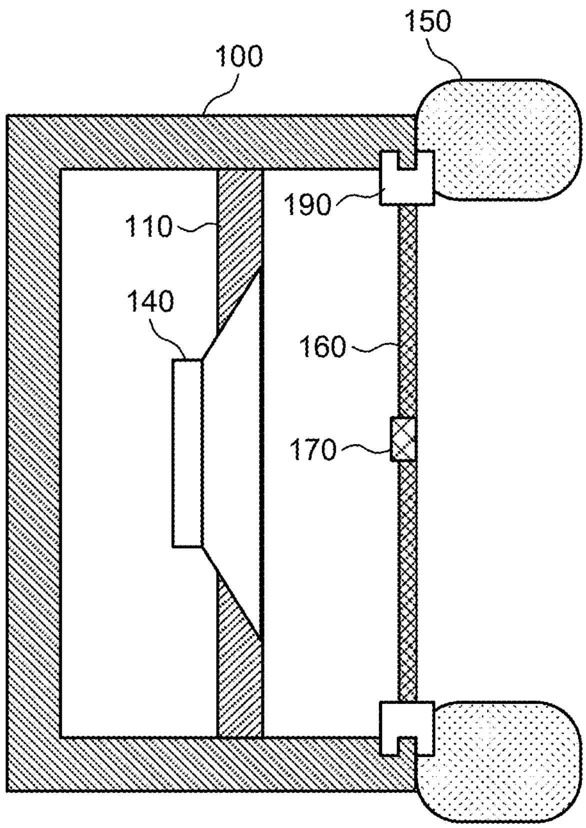
FIG. 7 is a diagram illustrating a configuration example of an acoustic processing device according to a second embodiment of the present disclosure.

FIG. 7 is a diagram illustrating a configuration example of the acoustic processing device according to the second embodiment of the present disclosure. The drawing is a schematic cross-sectional view illustrating the configuration example of the acoustic processing device 10 similarly to FIG. 1. The acoustic processing device 10 is different from the acoustic processing device 10 of FIG. 1 in that an ear pad coupling unit 190 is further included.

The ear pad coupling unit 190 in the drawing couples the ear pad 150 and the housing 100. The microphone holder 160 in the drawing is disposed in the ear pad coupling unit 190.

The other configuration of the acoustic processing device 10 is similar to the configuration of the acoustic processing device 10 of the first embodiment of the disclosure, and thus description thereof is omitted.

As described above, in the acoustic processing device 10 according to the second embodiment of the disclosure, since the microphone holder 160 is disposed in the ear pad coupling unit 190, the ear pad 150 can be easily replaced, and the convenience can be further improved.

3. Third Embodiment

In the acoustic processing device 10 of the first embodiment described above, the microphone 170 and the transfer function detection unit 210 are connected by the microphone signal line 180. Meanwhile, an acoustic processing device 10 according to a third embodiment of the disclosure is different from the above-described first embodiment in that connection is made via a coupling unit 184.

[Configuration of Acoustic Processing Device]

Figure 8:
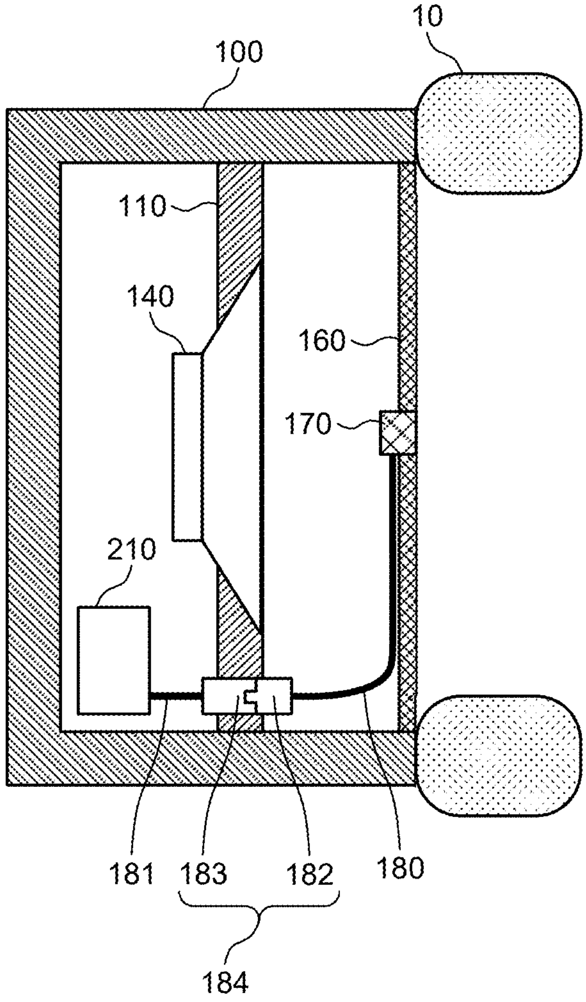
FIG. 8 is a diagram illustrating a configuration example of an acoustic processing device according to a third embodiment of the present disclosure.

FIG. 8 is a diagram illustrating a configuration example of the acoustic processing device according to the third embodiment of the present disclosure. The drawing is a schematic cross-sectional view illustrating the configuration example of the acoustic processing device 10 similarly to FIG. 1. The acoustic processing device 10 is different from the acoustic processing device 10 of FIG. 1 in that a microphone signal line 181 and the coupling unit 184 are further included.

A microphone signal line 180 in the drawing is connected to a transfer function detection unit 210 via the coupling unit 184. The coupling unit 184 includes coupling units 182 and 183. The coupling unit 182 is connected to the microphone signal line 180. Meanwhile, the coupling unit 183 is disposed in the partition wall 110 and connected to the microphone signal line 181. By fitting the coupling unit 182 into the coupling unit 183, the microphone signal lines 180 and 181 are electrically connected, whereby a sound signal can be transmitted. By detaching the coupling unit 182 from the coupling unit 183, the microphone signal line 180 and a microphone 170 can be easily detached from a housing 100. Note that the shape and the material of the coupling unit 184 are not particularly limited, and for example, a plastic socket can be used. Alternatively, a socket that attracts using a magnet can be used. Incidentally, as the shape of the socket, a predetermined standard such as the universal serial bus (USB) and the high-definition multimedia interface (HDMI) (registered trademark) or other standards can be adopted.

Meanwhile, the microphone signal line 180 in the drawing is an example of being attached along the microphone holder 160. Specifically, the microphone signal line 180 in the drawing is disposed along the microphone holder 160. The microphone signal line 180 preferably includes a highly flexible member such as a flexible board. This is for not hindering the movement of the microphone holder 160. Furthermore, the microphone signal line 180 is preferably fixed to the microphone holder 160. This is because generation of abnormal noise due to contact with the housing 100 or the like can be prevented. The microphone signal line 180 can be bonded and fixed to the microphone holder 160 with an adhesive agent or the like. Furthermore, in a case where the microphone holder 160 includes a net-like film, the microphone signal line 180 can be interwoven and fixed to the microphone holder 160. Furthermore, in order to prevent electric leakage, ignition, and the like, the microphone signal line 180 can be insulated. For example, the microphone signal line 180 covered with an insulating film can be used.

The other configuration of the acoustic processing device 10 is similar to the configuration of the acoustic processing device 10 of the first embodiment of the disclosure, and thus description thereof is omitted.

As described above, since the acoustic processing device 10 according to the third embodiment of the disclosure connects the microphone signal line 180 via the coupling unit 184, the convenience can be further improved.

4. Fourth Embodiment

The acoustic processing device 10 according to the first embodiment described above detects the transfer characteristics using the microphone 170. Meanwhile, an acoustic processing device 10 according to a fourth embodiment of the disclosure is different from the first embodiment in that a sensor for measuring the shape of a pinna 401 is further included.

[Configuration of Acoustic Processing Device]

Figure 9:
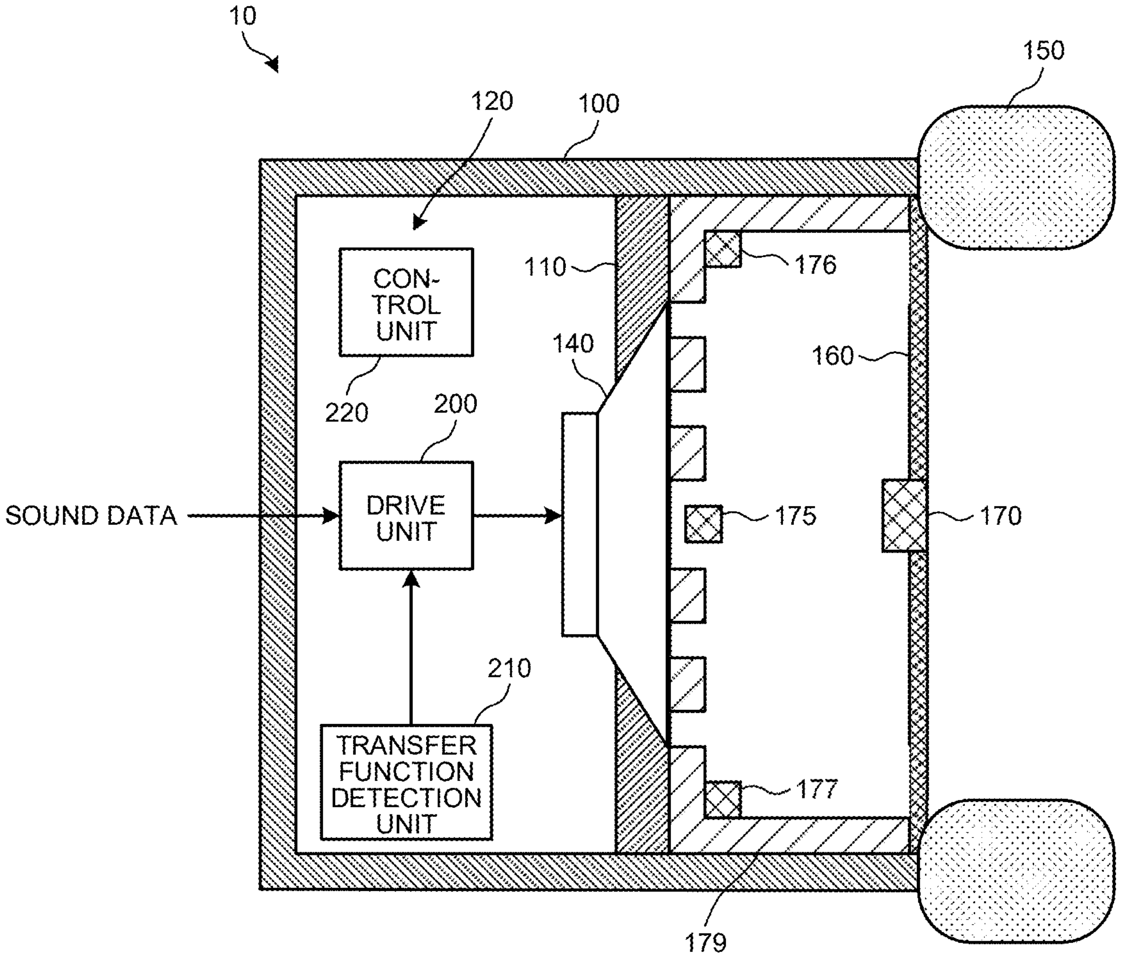
FIG. 9 is a diagram illustrating a configuration example of an acoustic processing device according to a fourth embodiment of the present disclosure.

FIG. 9 is a diagram illustrating a configuration example of the acoustic processing device according to the fourth embodiment of the present disclosure. The drawing is a schematic cross-sectional view illustrating the configuration example of the acoustic processing device 10 similarly to FIG. 1. The acoustic processing device 10 is different from the acoustic processing device of FIG. 1 in that sensors 175 to 177 and a sound absorbing member 179 are further included.

The sensors 175 to 177 detect an ultrasonic wave output from a speaker 140. These sensors 175 to 177 detect the ultrasonic wave output from the speaker 140 and reflected from an external auditory canal 403 and an eardrum 404, convert the ultrasonic wave into an electric signal, and output the electric signal. This electric signal is transmitted to a transfer function detection unit 210 by a signal line (not illustrated). The transfer function detection unit 210 estimates and detects the shape of a pinna 401 and transfer characteristics from the external auditory canal 403 to the eardrum 404 by the signal from the sensor 175 and others. For the estimation of the transfer characteristics, three-dimensional acoustic simulation, sound-structural interaction simulation, and the like can be used to. In a case where pairs of shape data of the pinna 401 and the like and data of transfer characteristics are ensured, it is also possible to estimate transfer characteristics by inputting shape data using machine learning for which the pairs have been used for learning. By combining this estimation result with the transfer characteristics estimated by the sound collected by the microphone 170, the detection accuracy of transfer characteristics can be further improved.

Note that, in FIG. 9, as a preferred example for implementing the fourth embodiment, the example in which the three sensors 175 to 177 are provided in the housing 100 has been described; however, the number, arrangement locations, and others of the sensors are not limited thereto. For example, the number of sensors may be two or less or four or more.

Furthermore, it is also possible to estimate a transfer function from a distance by associating the shape of the pinna 401 and the like with a desired sound source. By performing signal processing on a reproduction signal on the basis of the estimated transfer function, it is also made possible to add a function such as virtual sound source presentation which implements as if sound is emitted from another place even though the reproduction is being performed by the speaker 140 of the acoustic processing device 10.

Note that a sensor that emits an ultrasonic wave by itself can be used as the sensors 175 to 177.

The sound absorbing member 179 absorbs ultrasonic waves. The sound absorbing member 179 is disposed on an inner wall of the housing 100 or a partition wall 110 on a front face side of the speaker 140 to reduce irregular reflection of ultrasonic waves by the housing 100 and others.

[Other Configurations of Acoustic Processing Device]

Figure 10:
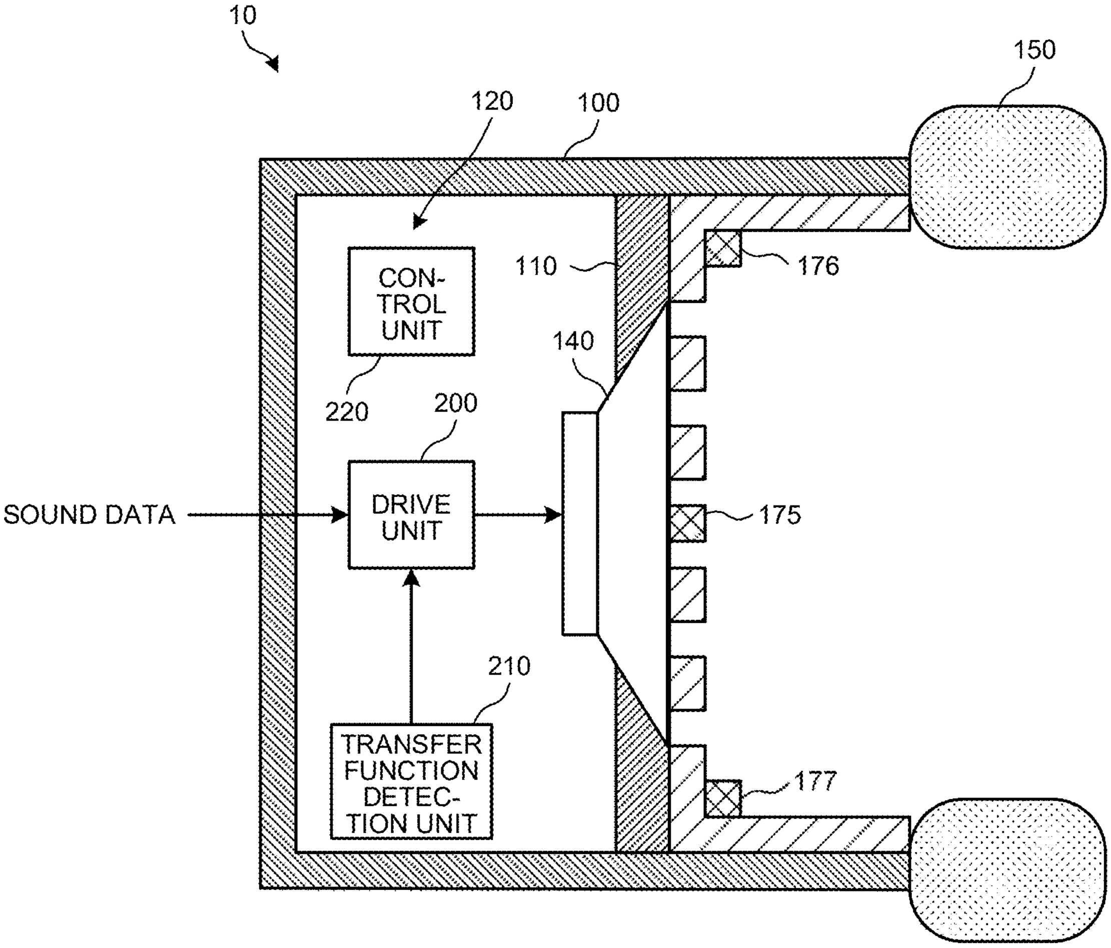
FIG. 10 is a diagram illustrating another configuration example of the acoustic processing device according to the fourth embodiment of the present disclosure.

FIG. 10 is a diagram illustrating another configuration example of the acoustic processing device according to the fourth embodiment of the present disclosure. The drawing is a schematic cross-sectional view illustrating the configuration example of the acoustic processing device 10 similarly to FIG. 9. The acoustic processing device 10 is different from the acoustic processing device 10 of FIG. 1 in that the microphone 170 and the microphone holder 160 are omitted.

The acoustic processing device 10 in the drawing detects transfer characteristics on the basis of signals from 175 to 177.

The other configuration of the acoustic processing device 10 is similar to the configuration of the acoustic processing device 10 of the first embodiment of the disclosure, and thus description thereof is omitted.

As described above, the acoustic processing device 10 according to the fourth embodiment of the present disclosure detects the transfer characteristics using the sensor 175 or others that detect an ultrasonic wave. The detection accuracy of the transfer function based on the shape of the external auditory canal 403 or the like can be improved.

5. Fifth Embodiment

In the acoustic processing device 10 of the first embodiment described above, the drive unit 200, the transfer function detection unit 210, and the control unit 220 are housed in the housing 100. Meanwhile, an acoustic processing device 10 according to a fifth embodiment of the disclosure is different from the first embodiment in that a drive unit 200 and others are arranged separately from a housing 100.

[Configuration of Acoustic Processing Device]

Figure 11:
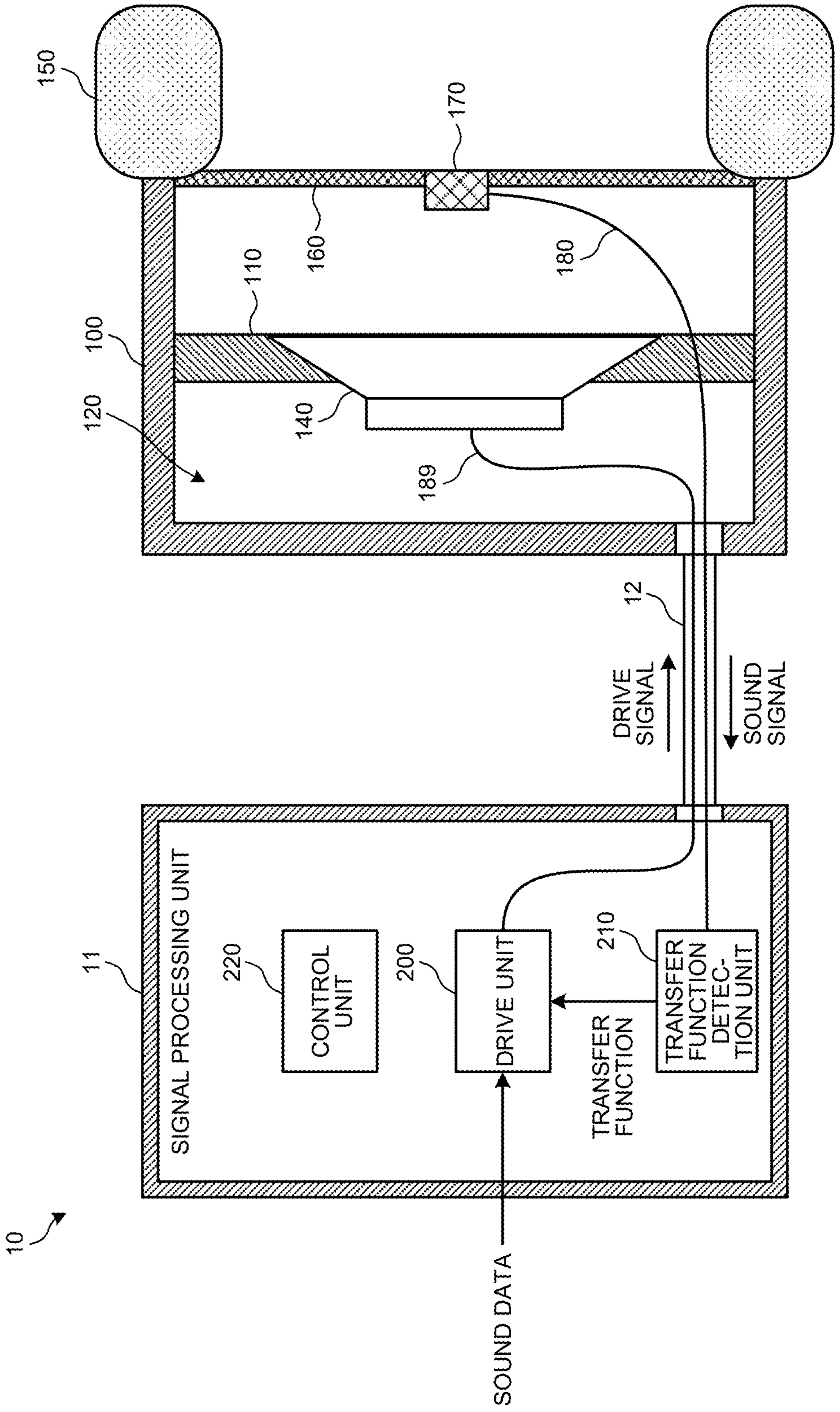
FIG. 11 is a diagram illustrating a configuration example of an acoustic processing device according to a fourth embodiment of the present disclosure.

FIG. 11 is a diagram illustrating a configuration example of the acoustic processing device according to the fourth embodiment of the present disclosure. The drawing illustrates the configuration example of an acoustic processing device 10 similarly to FIG. 1. The acoustic processing device 10 in the drawing is different from the acoustic processing device 10 in FIG. 1 in that a signal processing unit 11 is further included.

The signal processing unit 11 includes a drive unit 200, a transfer function detection unit 210, and a control unit 220. The signal processing unit 11 is disposed in a housing different from a housing 100. A speaker 140 and a microphone 180 are arranged in the housing 100 in the drawing. The signal processing unit 11 and the housing 100 are connected by a signal cable 12. In the signal cable 12, a microphone signal line 180 and a speaker signal line 189 are arranged. The speaker signal line 189 is a signal line (not illustrated in FIG. 1) that transmits a drive signal of the speaker 140 output from the drive unit 200.

The signal processing unit 11 can be configured by dedicated hardware (signal processing device). Alternatively, the signal processing unit 11 can also be configured by a personal computer or the like. In this case, the transfer function detection unit 210 and others are implemented by software processing.

Effects

An acoustic processing device 10 includes: a speaker 140; a housing 100 including a partition wall that holds the speaker 140 and separates a front face and a back face of the speaker 140; an ear pad 150 attached along the housing 100, the ear pad having a shape that surrounds a pinna when worn on a person; a microphone 170 that collects a sound wave output from the speaker 140 and outputs a sound signal; a microphone holder 160 that holds the microphone 170, the microphone holder having a film shape disposed in the vicinity of the ear pad 150; and a transfer characteristic detection unit that detects transfer characteristics of the external ear of the person on the basis of the sound signal that has been output. As a result, the transfer characteristics can be detected on the basis of the signal of the microphone 170.

Furthermore, the microphone holder 160 may be attached in a stretched manner along the contour of the pinna at the time of wearing. As a result, displacement of the microphone can be mitigated.

Alternatively, the microphone holder 160 may be disposed in the ear pad 150. As a result, the microphone 170 can be disposed at a position close to the pinna.

Furthermore, an ear pad coupling unit 190 that couples the ear pad 150 to the housing 100 may be further included, and the microphone holder 160 may be disposed in the ear pad coupling unit 190. As a result, the microphone holder 160 can be easily attached and detached.

Furthermore, the microphone holder 160 may have elasticity and acoustic permeability. As a result, pressuring of the pinna 401 can be mitigated.

Furthermore, the microphone may be installed substantially in the middle of the microphone holder.

Furthermore, a microphone signal line 180 that transmits the output sound signal to the transfer characteristic detection unit may be further included.

In addition, the transfer characteristics detection unit may be disposed behind the speaker 140, and the microphone signal line 180 may be disposed to penetrate through the partition wall.

Furthermore, the microphone signal line may include a plurality of wires.

In addition, the plurality of wires may be coupled by a coupling unit. This makes it possible to easily attach and detach the microphone 170.

Incidentally, the coupling unit 184 may be disposed on the partition wall.

Furthermore, the microphone signal line 180 may be fixed to the microphone holder 160.

Furthermore, a supply unit that wirelessly transmits the output sound signal to the transfer characteristic detection unit may be further included. As a result, the number of wires can be reduced.

Furthermore, a drive unit that drives the speaker 140 on the basis of the detected transfer characteristics may be further included. As a result, the sound data and others can be adjusted depending on the transfer characteristics.

Furthermore, the transfer characteristic detection unit may detect the transfer characteristics by estimating the transfer characteristics from shape data of the external ear using machine learning.

Note that the effects described herein are merely examples and are not limiting, and other effects may also be achieved. In addition, the drawings merely illustrate preferred examples for implementing the embodiments of the present disclosure, and the present technology is not limited thereto. Furthermore, the technology of the present disclosure is also applicable to acoustic processing devices (for example, headphones, hearing aids, and the like) other than headphones.

Note that the present technology can also have the following configurations.

(1) An acoustic processing device comprising:
  a speaker;
  a housing including a partition wall that holds the speaker and separates a front face and a back face of the speaker;
  an ear pad fixed to the housing, the ear pad having a shape that surrounds a pinna when worn by a person;
  a microphone that collects a sound wave output from the speaker and outputs a sound signal;
  a microphone holder that holds the microphone, the microphone holder having a film shape disposed in a vicinity of the ear pad; and
  a transfer characteristic detection unit that detects a transfer characteristic of an external ear of the person on a basis of the sound signal that has been output.

(2) The acoustic processing device according to the above (1),
  wherein the microphone holder is attached in a stretched manner along a contour of the pinna at the time of wearing.

(3) The acoustic processing device according to the above (1),
  wherein the microphone holder is disposed in the ear pad.

(4) The acoustic processing device according to the above (1), further comprising:
  an ear pad coupling unit that couples the ear pad to the housing,
  wherein the microphone holder is disposed in the ear pad coupling unit.

(5) The acoustic processing device according to the above (1),
  wherein the microphone holder has elasticity and acoustic permeability.

(6) The acoustic processing device according to any one of the above (1) to (5),
  wherein the microphone is installed substantially in middle of the microphone holder.

(7) The acoustic processing device according to any one of the above (1) to (6), further comprising:
  a microphone signal line that transmits, to the transfer characteristic detection unit, the sound signal that has been output.

(8) The acoustic processing device according to the above (7),
  wherein the transfer characteristic detection unit is disposed behind the speaker, and
  the microphone signal line is disposed to penetrate through the partition wall.

(9) The acoustic processing device according to the above (8),
  wherein the microphone signal line includes a plurality of wires.

(10) The acoustic processing device according to the above (9),
  wherein the plurality of wires is coupled by a coupling unit.

(11) The acoustic processing device according to the above (10),
  wherein the coupling unit is disposed on the partition wall.

(12) The acoustic processing device according to the above (7),
  wherein the microphone signal line is attached along the microphone holder.

(13) The acoustic processing device according to any one of the above (1) to (12), further comprising:
  a supply unit that wirelessly transmits, to the transfer characteristic detection unit, the sound signal that has been output.

(14) The acoustic processing device according to any one of the above (1) to (13), further comprising:
  a drive unit that drives the speaker on a basis of the transfer characteristic that has been detected.

(15) The acoustic processing device according to any one of the above (1) to (14),
  wherein the transfer characteristic detection unit detects the transfer characteristic by estimating the transfer characteristic from shape data of the external ear using machine learning.

REFERENCE SIGNS LIST

10 ACOUSTIC PROCESSING DEVICE
100 HOUSING
110 PARTITION WALL
140 SPEAKER
150 EAR PAD
160 MICROPHONE HOLDER
170 MICROPHONE
175 to 177 SENSOR
179 SOUND ABSORBING MEMBER
180, 181 MICROPHONE SIGNAL LINE
182 to 184 COUPLING UNIT
190 EAR PAD COUPLING UNIT

200 DRIVE UNIT
210 TRANSFER FUNCTION DETECTION UNIT

The invention claimed is:

1. An acoustic processing device, comprising:
a speaker configured to output a sound wave;
a housing including a partition wall, wherein the partition wall:
holds the speaker; and
separates a front face of the speaker and a back face of the speaker;
an ear pad fixed to the housing, wherein
in a case where the acoustic processing device is worn by a person, the ear pad has a shape that surrounds a pinna of the person;
a microphone configured to:
collect the sound wave; and
output a sound signal;
a microphone holder that holds the microphone, wherein the microphone holder has a film shape in a vicinity of the ear pad;
circuitry behind the speaker; and
a microphone signal line that penetrates through the partition wall, wherein
the microphone signal line is configured to transmit the sound signal to the circuitry, and
the circuitry is configured to detect a first transfer characteristic of an external ear of the person based on the sound signal.

2. The acoustic processing device according to claim 1, wherein the microphone holder extends along a contour of the pinna at a time of wearing of the acoustic processing device.

3. The acoustic processing device according to claim 1, wherein the microphone holder is in the ear pad.

4. The acoustic processing device according to claim 1, further comprising an ear pad coupling unit that couples the ear pad to the housing, wherein the microphone holder is in the ear pad coupling unit.

5. The acoustic processing device according to claim 1, wherein the microphone holder has elasticity and acoustic permeability.

6. The acoustic processing device according to claim 1, wherein the microphone is substantially in middle of the microphone holder.

7. The acoustic processing device according to claim 1, wherein the microphone signal line includes a plurality of wires.

8. The acoustic processing device according to claim 7, further comprising a coupling unit that couples the plurality of wires.

9. The acoustic processing device according to claim 8, wherein the coupling unit is on the partition wall.

10. The acoustic processing device according to claim 1, wherein the microphone signal line is attached along the microphone holder.

11. The acoustic processing device according to claim 1, further comprising a supply unit configured to wirelessly transmit, to the circuitry, the sound signal.

12. The acoustic processing device according to claim 1, wherein the circuitry is further configured to drive the speaker based on the detected first transfer characteristic.

13. The acoustic processing device according to claim 1, wherein the circuitry is further configured to:
estimate, based on machine learning, a second transfer characteristic from shape data of the external ear; and
detect the first transfer characteristic based on the estimated second transfer characteristic.

14. An acoustic processing device, comprising:
a speaker configured to output a sound wave;
a housing including a partition wall, wherein the partition wall:
holds the speaker; and
separates a front face of the speaker and a back face of the speaker;
an ear pad fixed to the housing, wherein in a case where the acoustic processing device is worn by a person, the ear pad has a shape that surrounds a pinna of the person;
a microphone configured to:
collect the sound wave; and
output a sound signal;
a microphone holder that holds the microphone, wherein the microphone holder has a film shape in a vicinity of the ear pad;
circuitry configured to detect a first transfer characteristic of an external ear of the person based on the sound signal; and
an ear pad coupling unit that couples the ear pad to the housing, wherein the microphone holder is in the ear pad coupling unit.

* * * * *